US009025606B2

(12) United States Patent
Thyni et al.

(10) Patent No.: US 9,025,606 B2
(45) Date of Patent: May 5, 2015

(54) METHOD AND NETWORK NODE FOR USE IN LINK LEVEL COMMUNICATION IN A DATA COMMUNICATIONS NETWORK

(75) Inventors: Tomas Thyni, Jarfalla (SE); Mats Forsman, Ronninge (SE)

(73) Assignee: Telefonaktiebolaget L M Ecrisson (publ), Stockholm (SE)

( * ) Notice: Subject to any disclaimer, the term of this patent is extended or adjusted under 35 U.S.C. 154(b) by 256 days.

(21) Appl. No.: 13/638,789

(22) PCT Filed: Apr. 1, 2010

(86) PCT No.: PCT/SE2010/050373
§ 371 (c)(1),
(2), (4) Date: Oct. 1, 2012

(87) PCT Pub. No.: WO2011/123007
PCT Pub. Date: Oct. 6, 2011

(65) Prior Publication Data
US 2013/0022048 A1    Jan. 24, 2013

(51) Int. Cl.
*H04L 12/28*    (2006.01)
*H04L 29/12*    (2006.01)
*H04L 12/931*    (2013.01)
*H04L 12/50*    (2006.01)

(52) U.S. Cl.
CPC ..... *H04L 29/12028* (2013.01); *H04L 29/12811* (2013.01); *H04L 29/12839* (2013.01); *H04L 61/103* (2013.01); *H04L 61/6009* (2013.01); *H04L 61/6022* (2013.01); *H04L 49/351* (2013.01)

(58) Field of Classification Search
None
See application file for complete search history.

(56) References Cited

U.S. PATENT DOCUMENTS

| 2005/0018624 | A1 | 1/2005 | Meier et al. | |
| 2005/0254444 | A1 | 11/2005 | Meier et al. | |
| 2009/0037607 | A1* | 2/2009 | Farinacci et al. | 709/249 |

FOREIGN PATENT DOCUMENTS

| EP | 1868354 | * 12/2007 | H04L 29/12 |
| EP | 1868354 A1 | 12/2007 | |
| WO | WO 02/076017 A2 | 9/2002 | |

* cited by examiner

*Primary Examiner* — Ayaz Sheikh
*Assistant Examiner* — Sori Aga

(57) ABSTRACT

In accordance with an embodiment of the present invention, a network node is presented which is configured to associate each of a plurality of MAC addresses with an IP address on a network level. The network node is configured to, upon reception of a link level message comprising a target IP address and destined to multiple network nodes, compare the target IP address with associated MAC/IP addresses on a network level, and to selectively send the received link level message to at least one other network node on a link level based on the network level comparison. A method and a computer program product are also presented, according to embodiments of the present invention.

7 Claims, 7 Drawing Sheets

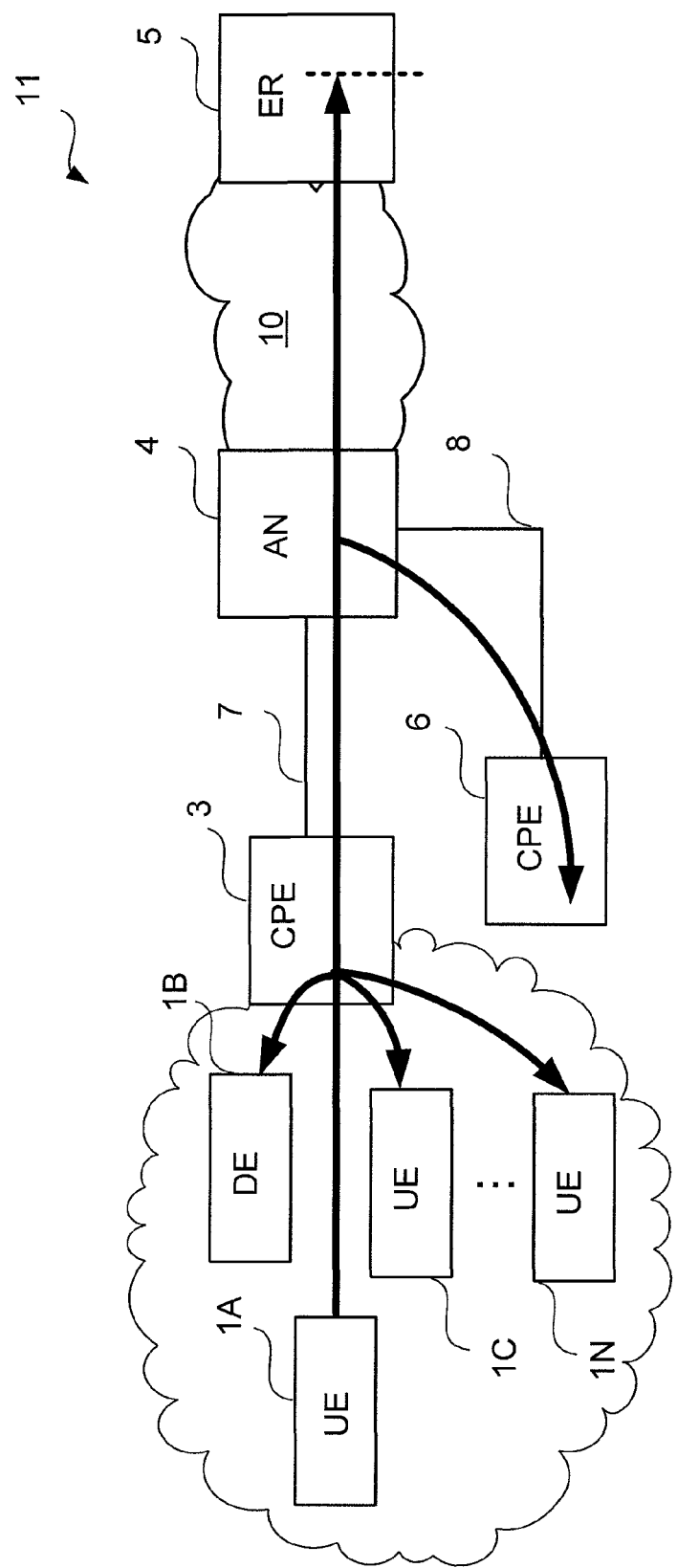
Fig. 1 - PRIOR ART

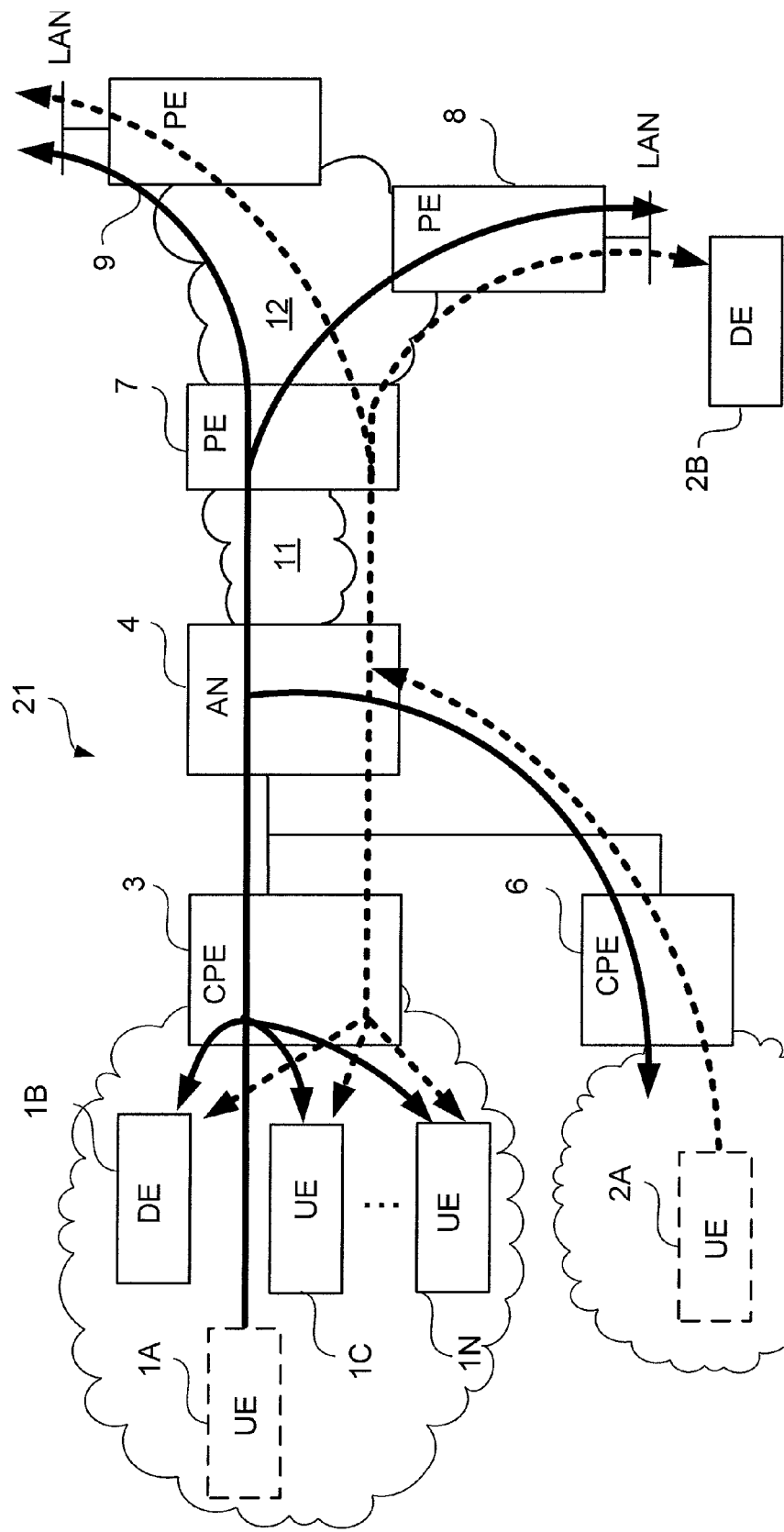
Fig. 2 - PRIOR ART

METHOD AND NETWORK NODE FOR USE IN LINK LEVEL COMMUNICATION IN A DATA COMMUNICATIONS NETWORK

TECHNICAL FIELD

A method and network node for use in link level communication in a data The invention relates in general to data communication and in particular to a network node for use in link level communication in a data communications network. The invention also relates to a method for use in a network node and to a computer program product.

BACKGROUND

Network protocols for use in network nodes communicating on a link level in an Ethernet based network conventionally use different broadcast or multicast messaging techniques for its various communication functions. The broadcast or multicast messages used are spread on a link level across the domain of the Ethernet based network to all network nodes/sites participating in the domain.

Understandably, this may cause large amount of broadcast or multicast data traffic to be generated by the network nodes. This will add to the load on the physical links in the Ethernet based network. Additionally, this will also cause various network nodes to populate its link level address tables with a large amount of link level addresses to different networks nodes all across the domain of the network.

In order to limit the impact of the large amount of broadcast or multicast data traffic that may be caused by the network nodes, there are different techniques for rate limiting the amount of broadcast or multicast data traffic allowed on individual links in the Ethernet based network. For example, a network node may comprise a fixed limit of the amount of broadcast or multicast data traffic it is allowed to distribute, wherein all data broadcast or multicast data traffic that would lead to the fixed limit being exceeded is discarded by the network node. This may also be implemented in order to protect the network nodes from certain types of data traffic.

SUMMARY

It is understood by the inventor that it is desirable to enable efficient link level communication by a network node that will result in lower data traffic loads in a data communications network.

This problem is addressed by a network node configured to associate each of a plurality of MAC addresses with an IP address on a network level. The network node is characterized in that it is configured to, upon reception of a link level message comprising a target IP address and destined to multiple network nodes, compare the target IP address with associated MAC/IP addresses on a network level, and to selectively send the received link level message to at least one other network node on a link level based on the network level comparison.

By checking on a higher protocol level, i.e. the network level, that the targeted network node in the received link level message destined to multiple network nodes, for example, is local to the network node or located behind a specific network node in a shared network domain, and having the network node selectively send out the link level message based on this information, an efficient link level communication that will result in lower data traffic loads in a data communications network between network nodes is enabled.

An advantage of the above described network node is that the link level message may be kept from being sent to network nodes at one or several remote sites in the data communications network if the actual target for the broadcast or multicast message is local to the network node or located behind a specific network node in a shared network domain. This is contrary to conventional link level communication, wherein even if no single network node at remote sites in the network is the actual target for the broadcast or multicast message, the network node will in any case spread the broadcast or multicast messages on a link level across the domain of the data communications network to all network nodes/sites participating in the domain of the data communications network. This will result in that unnecessary data traffic caused by the conventional link level communication may be excluded from the data communications network, which in turn will lower the data traffic load on the physical links between the network nodes in the data communications network.

A further advantage of the above described network node is that link level address tables in network nodes at remote sites in the data communications network may avoid being populated with potentially a large amount of unnecessary link level addresses.

The network node may also be configured to, in case the target IP address is found on the network level in the network level comparison, send the link level message on a link level exclusively towards the network node indicated by the associated MAC/IP addresses on a network level. The network node may thus selectively send the received link level message destined to multiple network nodes directly towards its actual target comprised in the network node's local network domain or exclusively to a specific network node in a shared network domain behind which the actual targeted network node is located. Only in case the target IP address is not found on the network level in the network level comparison is the link level message sent out to all network nodes.

Alternatively, the network node may be configured to send the link level message on a link level exclusively to all network nodes in the network node's local network domain in case the target IP address is found on the network level. In this case, it is assumed that if the target IP address is found on the network level, the targeted network node is local to the network node, i.e. located within the network node's local network domain. If the targeted network node is verified as local to the network node, the received link level message may be dropped by the network node towards other network nodes, and thus not be distributed further within the domain of the data communications network. Only in case the target IP address is not found on the network level in the network level comparison is the link level message further distributed to all of the network nodes in the host or shared network domain in the data communication network.

Furthermore, the network node may be configured to perform the network level comparison by comparing the target IP address to cached information about associated MAC/IP addresses in a MAC/IP cache on the network level, wherein the cached information indicates a physical or logical interface port in the network node for each associated MAC/IP address. This further defines the network node as being Layer 3 IP aware about local paired MAC/IP address without performing any actual IP routing. The physical or logical interface port in the network node indicated by an associated MAC/IP address that matches the target IP address in the network level comparison may be used by the network node in sending the link level message on the link level.

The link level message on a link level may be a broadcast or multicast message that are part of the IETF Link Layer protocols ARP for IPv4 or NDP for IPv6. The Address Resolution Protocol (ARP) and Neighbor Discovery Protocol (NDP) are link level protocols for use by network nodes communicating on a link level in the data communication network. The link level messages sent by these link level protocols can not be filtered according to any known filtering technique in a network node, because they are required if any two network nodes desire to communicate with each other.

The network node may be an Ethernet switch or logical bridge/switch (PE) in a IP/MPLS VPLS domain in a Carrier Ethernet network, or it may be a bridged residential broadband access customer premises equipment (CPE) or access node (AN) for xDSL, xPON or P2P Ethernet. This allows the network node to be implemented in a business L2 VPN (IP/MPLS VPLS) data communication network, as well as, in a residential data communication network.

According to another aspect of the invention, this problem is also addressed by a method for use in a network node configured to associate each of a plurality of MAC addresses with an IP address on a network level. The method is characterized by the steps of: upon reception of a link level message destined to multiple network nodes and comprising a target IP address, comparing the target IP address with associated MAC/IP addresses on a network level; and selectively sending the received link level message to at least one other network node on a link level based on the network level comparison.

According to a further aspect of the invention, this problem is also addressed by a computer program product for use in a network node configured to associate each of a plurality of MAC addresses with an IP address on a network level, which comprises computer readable code means, which when run in a processing unit in the network node causes said network node to perform the steps of: upon reception of a link level message destined to multiple network nodes and comprising a target IP address, comparing the target IP address with associated MAC/IP addresses on a network level; and selectively sending the received link level message to at least one other network node on a link level based on the network level comparison.

Further advantageous embodiments of the method and computer program product are set forth in the dependent claims and correspond to the advantageous embodiments already set forth with reference to the previously mentioned network node.

BRIEF DESCRIPTION OF THE DRAWINGS

The objects, advantages and effects as well as features of the invention will be more readily understood from the following detailed description of exemplary embodiments of the invention when read together with the accompanying drawings, in which:

FIG. 1 illustrates an example of link level communication in a data communication network.

FIG. 2 illustrates another example of link level communication in a data communication network.

DETAILED DESCRIPTION

Figure 4:
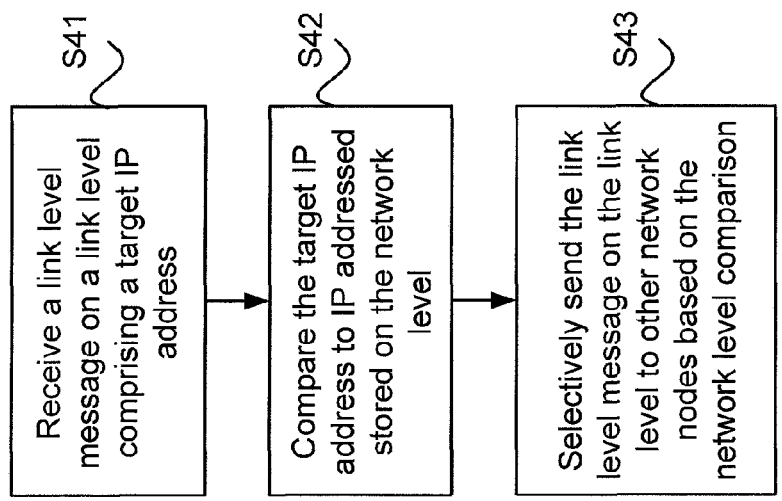
FIG. 4 shows a flowchart of a method according to an embodiment of the invention.

FIG. 1 shows a data communication network 11 delivering broadband access to a number of user equipments in customer premises networks according to prior art. The data communication network 11 may be an Ethernet Layer 2 physical or logical network, and is typical for a residential broadband access network.

It should be noted that Layer 2 (or L2) here refers to the data link layer of the conventional Open System Interconnection Reference Model (also referred to as the OSI Reference Model or the OSI Model) of computer networking. Link layer (L2) protocols respond to service requests from an upper network layer (Layer 3 or L3) and perform their functions by issuing service requests to the lower physical layer (Layer 1 or L1). The link layer (L2) protocols provide for data transfer across the physical link between network nodes through the use of unambiguous hardware addresses, such as, Media Access Control (MAC) addresses. A frame's header on the link layer (L2) contains source and destination addresses that indicate which network node originated the frame and which network node is expected to receive it. In contrast to the hierarchical and routable addresses of the network layer (L3), link layer (L2) addresses are flat, meaning that no part of the link layer (L2) address can be used to identify the logical or physical group to which the link layer (L2) address belongs. In order to denote this particular level or protocol layer of data communication, the term "link level" is used throughout this description and in the claims.

Layer 3 (L3) refers to the network layer of the conventional Open System Interconnection Reference Model (also referred to as the OSI Reference Model or the OSI Model) of computer networking. Network layer (L3) protocols responds to service requests from the upper transport layer (L4) and perform their functions by issuing service requests to the lower link layer (L2). The network layer (L3) protocols provide for the functional and procedural means of transferring variable length data sequences from a source to a destination via one or more networks and network nodes, while maintaining quality of service and error control. This is performed by using hierarchical and routable addresses, i.e. IP addresses. While the link layer (L2) may be described as being responsible for node-to-node frame delivery, the network layer (L3) may be described as being responsible for end-to-end network node (source to destination) packet delivery including routing through intermediate network nodes. In order to denote this particular level or protocol layer of data communication, the term "network level" is used throughout this description and in the claims.

In FIG. 1, an edge router ER 5 may represent the border of a hosted network domain in the Ethernet Layer 2 physical or logical network, which may be further connected to a core or regional network. The ER 5 may be connected to at least one access node AN 4 through an aggregation network 10, the AN 4 thus forming a part of the local network domain of the ER 5. The aggregation network 10 may also be referred to as an Ethernet aggregation network. The AN 4 may be connected to a number of customer premises networks through customer premises equipment CPE 3, 6, the CPE 3, 6 thus forming a part of the local network domain of the AN 4. A CPE is a device interfacing access lines 7, 8 and can for example be an ADSL modem or a cable modem with router or bridge functionality or similar. To each CPE 3, 6 a number of user equipments UE may be connected, here, the user equipments UE 1A-1N forms a part of the local network domain of the CPE 3.

FIG. 1 illustrates how link level messages destined to multiple network nodes are spread from a network node UE 1A across the hosted network domain to all network nodes ER 5, AN 4, CPE 3, CPE6, UE 1B-1N, etc., participating in the hosted network domain according to the prior art. Examples of such link level messages destined to multiple network nodes are broadcast or multicast messages of different protocols on the link level. These broadcast or multicast messages of the link level protocols are normally required to be sent if any two network nodes in the data communication network 11 desires to communicate with each other. Examples of such link level protocols are the IETF Link Layer protocols the Address Resolution Protocol (ARP) for IPv4 or Neighbor Discovery Protocol (NDP) for IPv6. For example, as shown by the arrows in FIG. 1, an ARP broadcast message or NDP multicast message originating from the UE 1A which targets the destination user equipment DE 1B in the local network domain of the customer premises network serviced by the CPE 3 will also be spread to all other network nodes, e.g. ER 5, AN 4, CPE 6, etc., participating in the hosted network domain.

As shown, these link level messages destined to multiple network nodes are spread from a network node across the hosted network domain to all network nodes participating in the hosted network domain, even though the actual target for the information/request in the link level message sent by UE 1A may be the destination user equipment DE 1B also participating in the local network domain of the customer premises network serviced by the CPE 3. This means that even though no single network node or device outside of the local network domain of the customer premises network serviced by the CPE 3 is the actual target for the information/request in the link level message, all network nodes ER 5, AN 4, CPE 3, CPE6, UE 1B-1N, etc., participating in the hosted network domain will receive the link level message sent by UE 1A. Thus, these link level messages cause unnecessary data traffic to be generated by the network nodes in the data communication network 11, which in turn will add to the load on the physical links in the data communication network 11.

Furthermore, upon receiving these link level messages destined to multiple network nodes, the network nodes, e.g. ER 5, AN 4, CPE 3, CPE6, UE 1B-1N, etc., will also populate their hardware address tables, such as, MAC address tables, with an entry post listing the hardware or MAC address for the network node, e.g. UE 1A, originating the link level message. Thus, because these link level messages are spread to all network nodes participating in the hosted network domain, several of the network nodes will populate their hardware address tables with potentially a large amount of unnecessary entries.

FIG. 2 shows another data communication network 21 delivering broadband access to a number of user equipments in customer premises networks according to prior art. The data communication network 21 may be an Ethernet Layer 2 physical or logical network, and is typical for a business L2 network, such as, for example, an IP/MPLS (Internet Protocol/Multi Service Edge Router) based virtual private LAN service (VPLS) network.

In FIG. 2, provider equipment PE 7-9 may represent the network nodes in a shared network domain in an Ethernet Layer 2 physical or logical network that may be connected through a core or regional network 12. While the PE 7 is shown connected to at least one access node AN 4 through an aggregation network 11, the AN 4 thus forming a part of the local network domain of the PE 7, it should also be understood that the PE 8-9 may also be arranged to support their own aggregation networks or local area networks (LAN) is the same manner (not shown). The AN 4 may be connected to a number of customer premises networks through customer premises equipment CPE 3, 6, the CPE 3, 6 thus forming a part of the local network domain of the AN 4. A CPE is a device interfacing access lines 7, 8 and can, for example, be a business server or similar. To each CPE 3, 6 a number of user equipments UE, DE may be connected, here, the user equipments UE, DE 1A-1N forms a part of the local network domain of the CPE 3 and the user equipment UE 2A forms a part of the local network domain of the CPE 6.

FIG. 2 illustrates how link level messages destined to multiple network nodes are spread from a network node UE 1A or UE 2A across the shared network domain to all network nodes PE 7-9, AN 4, CPE 3, CPE6, UE-DE 1B-1N, UE-DE 2A-2B, etc., participating in the shared network domain according to the prior art. Examples of such link level messages destined to multiple network nodes are broadcast or multicast messages of different protocols on the link level. In FIG. 2, the fully drawn arrows and the dashed arrows may here represent, for example, the link level message paths of a link level message belonging to the Address Resolution Protocol (ARP) for IPv4, and the link level message paths of a link level message belonging to the Neighbor Discovery Protocol (NDP) for IPv6, respectively. For example, as shown by the fully drawn arrows in FIG. 2, an ARP broadcast message originating from the UE 1A which targets the DE 1B in the local network domain of the customer premises network serviced by the PE 7 will also be spread to remote network nodes, e.g. PE 8-9, CPE 6, DE 2B, etc., participating in the shared network domain. According to another example, shown by the dashed arrows in FIG. 2, an NDP multicast message originating from the UE 2A which targets the DE 2B in a remote network domain of the access network serviced by the PE 9 will also be spread to remote network nodes, e.g. PE 8, etc., participating in the shared network domain.

For the same reasons as explained above in reference to FIG. 1 and as can be seen by the examples in FIG. 2, the link level messages will cause unnecessary data traffic to be generated by the network nodes in the data communication network 21, which in turn will add to the load on the physical links in the data communication network 21. Consequently, the network nodes may also populate their hardware address tables, such as, MAC address tables, with an entry post listing the hardware or MAC address for the network node (e.g. UE 1A or UE 2A) originating the link level message. Thus, because these link level messages are spread to all network nodes participating in the shared network domain, several of the network nodes will populate their hardware address tables with a potentially large amount of unnecessary entries.

Figure 3:
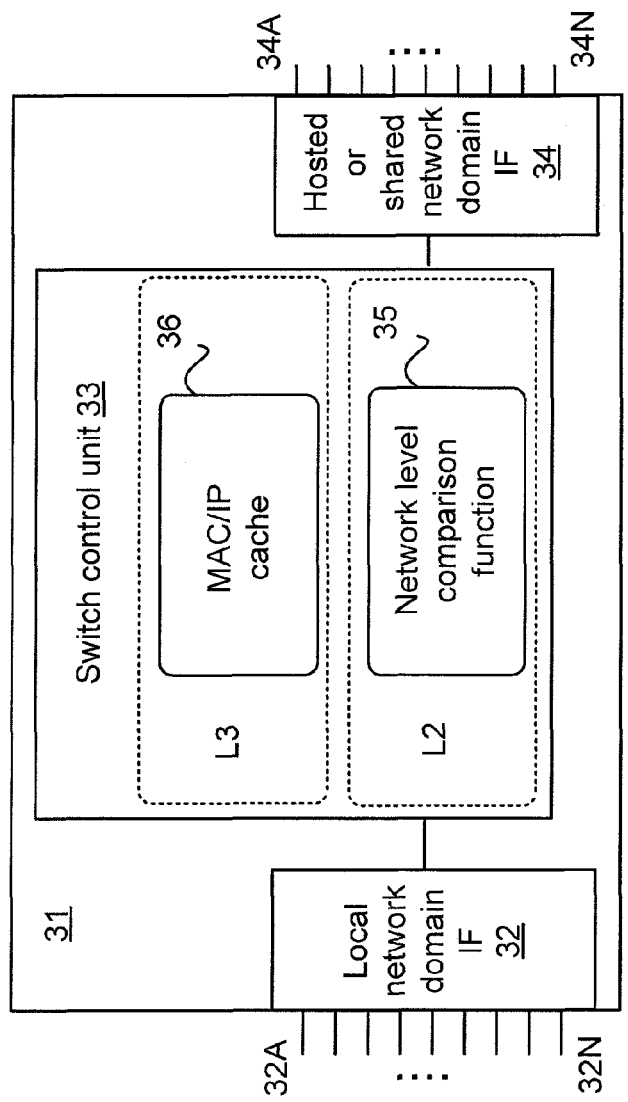
FIG. 3 shows a network node according to an embodiment of the invention.

FIG. 3 shows a network node 31 according to an embodiment of the invention. The network node 31 may be a physical switch or a network node comprising a logical/bridge switching function, such as, for example, a virtual private LAN service (VPLS). The network node 31 may comprise a local network domain interface 32 for receiving/sending data traffic over a single or multiple number of local interface ports 32A-32N and a hosted or shared network domain interface 34 for receiving/sending data traffic over a single or multiple number of remote interface ports 34A-34N. The interface ports 32A-32N, 34A-34N may represent physical and/or logical ports of the local network domain interface 32 and of the hosted or shared network domain interface 34, respectively. The network node 31 may also comprise a switch control unit 33 that may be arranged to receive/send data traffic from/to the local and hosted or shared network domain interfaces 32, 34 and perform different switching functions on various data communication layers according to the OSI Model in dependence of the data traffic received. The network node 31 may thus be configured to receive link level messages from other network nodes which comprise target IP addresses and are destined to multiple network nodes, such as, for example, IPv4 ARP Broadcast messages and/or IPv6 ND Multicast messages. The link level messages sent by these link level protocols can not be filtered by the network node according to any known filtering technique because they are required if any two network nodes desire to communicate with each other.

According to an embodiment of the invention, upon receiving the link level (L2) message comprising a target IP address and destined to multiple network nodes, the network node 31 may be configured to inspect the link level (L2) messages, e.g IPv4 ARP Broadcast messages and/or IPv6 ND Multicast messages, and retrieve the target IP addresses in these link level (L2) messages. The network node 31 may then be arranged to compare this target IP address with associated MAC/IP addresses stored on a network level (L3). This may, for example, be performed by a L2 network level comparison function 35 in the switch control unit 33 being arranged to access cached information in a MAC/IP cache 36 on the network level (L3). This may be performed by the L2 network level comparison function 35 without doing any IP routing. The cached information in a MAC/IP cache 36 on the network level (L3) may comprise associated MAC/IP addresses, which also may indicate which of the local interface ports 32A-32N in the local network domain interface 32 should be used for receiving/sending data traffic to/from each of the associated MAC/IP address.

If the network level comparison results in that the target IP address is found amongst the associated MAC/IP addresses stored on the network level (L3), the network node 31 is able to determine that the actual target of the link level (L2) message is either located in the local network domain of the network node 31 or behind a specific network node in a shared network domain. In this case, the network node 31 may be configured to exclusively send the received link level (L2) message directly towards the actual target of the link level (L2) message in the local network domain of the network node 31, or exclusively to a specific network node in a shared network domain of the network node 31 behind which the actual targeted network node is located. This may be performed, for example, by sending it out on either a local interface port 32A-32N in the local network domain interface 32 or a remote interface port 34A-34N in the hosted or shared network domain interface 34 whichever is indicated by the associated MAC/IP address on the network level (L3). The link level (L2) message is then suppressed or dropped towards other interface ports 32A-32N, 34A-34N in the network node 31, i.e. towards any other network node.

Alternatively, according to another embodiment of the invention, the network node 31 may be configured to, upon receiving the link level (L2) message comprising a target IP address and destined to multiple network nodes, send the link level (L2) message out on all interface ports 32A-32N in the local network domain interface 32. The network node 31 may be thereafter inspect the link level (L2) message, retrieve the target IP address, and perform the network level comparison described above. If the network level comparison results in that the target IP address is found amongst the associated MAC/IP addresses stored on the network level (L3), the network node 31 assumes that the actual target of the link level (L2) message is located in the local network domain of the network node 31, whereby the link level (L2) message has already been sent to its actual target. Therefore, no further sending of the link level (L2) message is necessary, and the network node 31 may be configured to suppress or drop the link level (L2) message towards the remote interface ports 34A-34N in the hosted or shared network domain interface 34 in the network node 31.

However, for both of the embodiments described above, if the network level comparison results in that the target IP address is not found amongst the associated MAC/IP addresses stored on the network level (L3), the network node 31 is not able to determine whether or not the actual target of the link level (L2) message is located in the local network domain of the network node 31 or anywhere else in a hosted or shared network domain of the network node 31. In this case, the network node 31 may be configured to send the received link level (L2) message out to all network nodes in the local network domain of the network node 31 (unless it already has been sent) and to all network nodes in the hosted or shared network domain of the network node 31. This may be performed, for example, by sending it out on all local interface ports 32A-32N in the local network domain interface 32 and by sending it out on all remote interface ports 34A-34N in the hosted or shared network domain interface 34.

The advantages and benefits of the network node 31 and the following methods are most suitably and illustratively presented in reference to FIGS. 7-8 which are described in more detail below.

FIG. 4 shows a flowchart of a method according to an embodiment of the invention. In step S41, the network node 31 may receive a link level message that comprises a target IP address; the link level message also being destined to multiple network nodes in the data communication network. Upon receiving said link level message, the network node 31 may in step S42, compare the target IP address comprised in the link level message with associated MAC/IP addresses on a network level. This may be performed by comparing the target IP address to cached information about associated MAC/IP addresses in a MAC/IP cache on the network level. The cached information may further indicate an interface port in the network node for each associated MAC/IP address therein.

In step S43, the network node 31 may selectively send the received link level message to at least one other network node on a link level based on the network level comparison. This may, for example, be performed by the network node 31 by sending the link level message exclusively towards the network node indicated by the associated MAC/IP addresses on a network level in case the target IP address is found on the network level. However, if the target IP address is not found on the network level, this may be performed by the network node 31 by sending the link level message on a link level to all network nodes in the local network domain and hosted or shared network domain of the network node 31.

Figure 5:
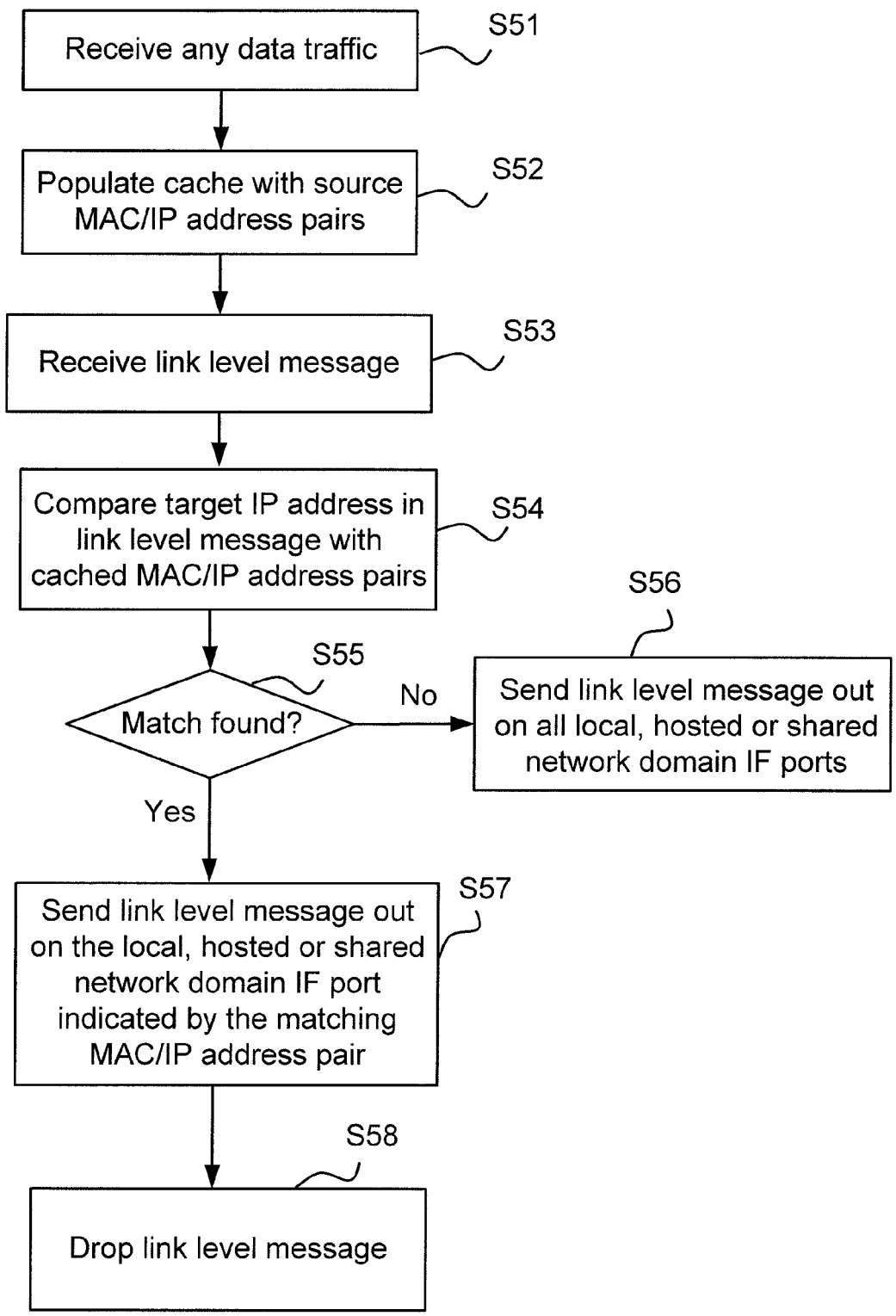
FIG. 5 shows a flowchart of a method according to another embodiment of the invention.

FIG. 5 shows a flowchart of a method according to an embodiment of the invention. In step S51, the network node 31 may receive data traffic from different network nodes in the data communications network. This may allow the network node 31 to associate each of a plurality of MAC addresses belonging to different network nodes with an IP address on a network level. In step S52, the network node 31 may thus populate its MAC/IP cache on the network level with associated MAC/IP addresses. Each of the associated MAC/IP addresses may also indicate an associated physical or logical interface port in its local or hosted/shared interfaces for communicating with said associated MAC/IP addresses.

In step S53, the network node 31 may receive a link level message, which is destined to multiple network nodes in the data communication network, comprising a target IP address. The link level message may, for example, be an IPv4 ARP Broadcast message and/or IPv6 ND Multicast message. In step S54, the network node 31 compares the target IP address in the received link level message with cached MAC/IP address pairs on a network level.

If a match is not found in step S55, the network node 31 may in step S56 send the received link level message to all network nodes in its local and hosted/shared network domain. This may be performed by the network node 31 by sending the link level message out on all interface ports in its local or hosted/shared network interface. On the contrary, if a match is found in step S55, the network node 31 may in step S57 send the link level message out on the interface port 32A-32N, 34A-34N in the local, hosted or shared network domain interface that is indicated by the matching MAC/IP address pair. In step S58, the network node 31 may drop or suppress the sending of the link level message to any further network node in the data communications network.

Figure 6:
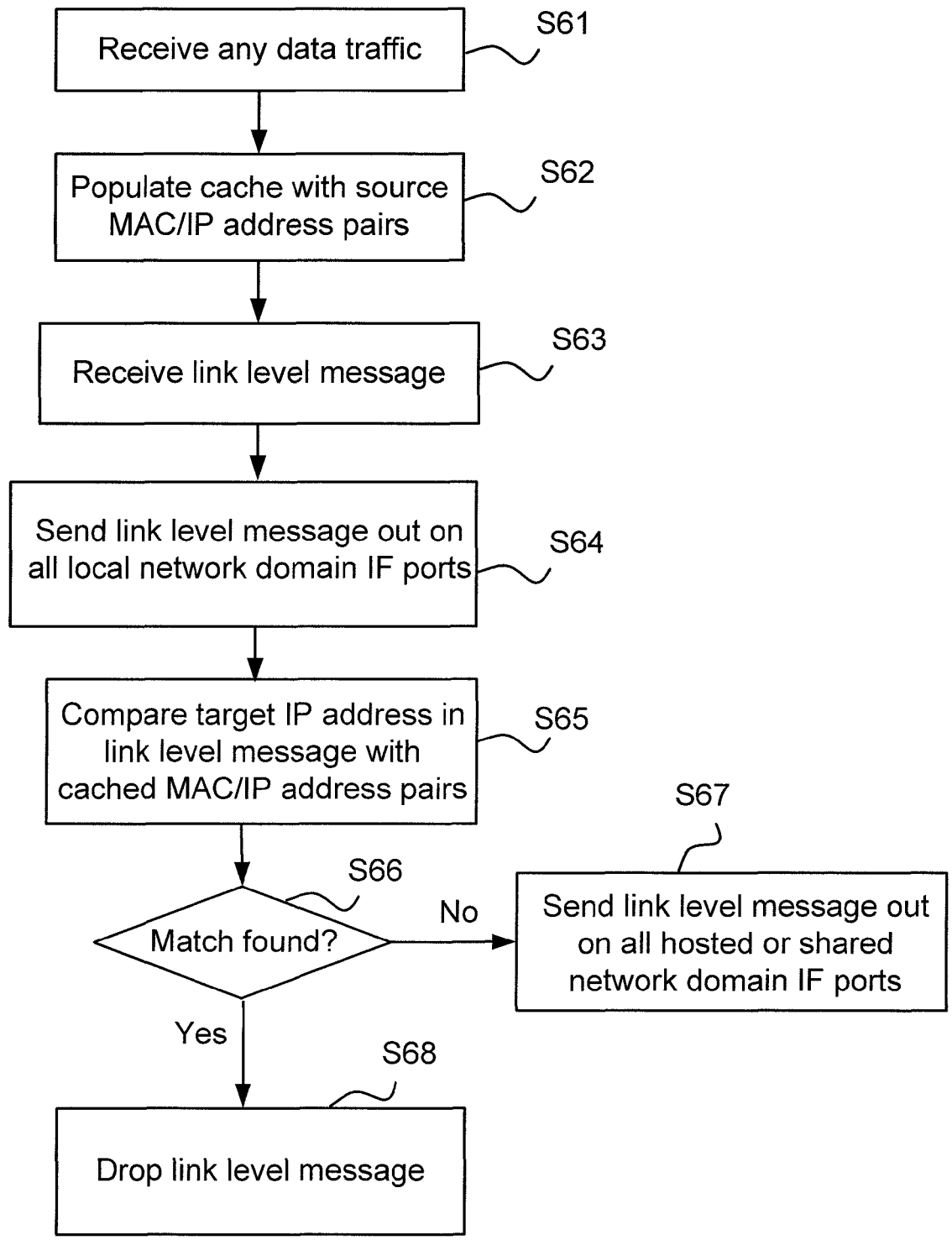
FIG. 6 illustrates an example of link level communication in a data communication network comprising a network node according to an embodiment of the invention.

FIG. 6 shows a flowchart of a method according to another embodiment of the invention. The steps S61-S63 are the same as the steps S51-S53 in the previous embodiment. However, in step S64, the network node 31 may send the received link level message to all network nodes in the local network domain of the network node 31. This may be performed by the network node 31 by sending the link level message out on all interface ports in its local network interface.

In step S65, the network node 31 compares the target IP address in the received link level message with cached MAC/IP address pairs on a network level. If a match is not found in step S65, the network node 31 may in step S67 send the received link level message to all network nodes in its hosted/shared network domain. This may be performed by the network node 31 by sending the link level message out on all interface ports in its hosted/shared network interface. In step S68, the network node 31 may drop or suppress the sending of the link level message to any further network node in the data communications network.

Figure 7:
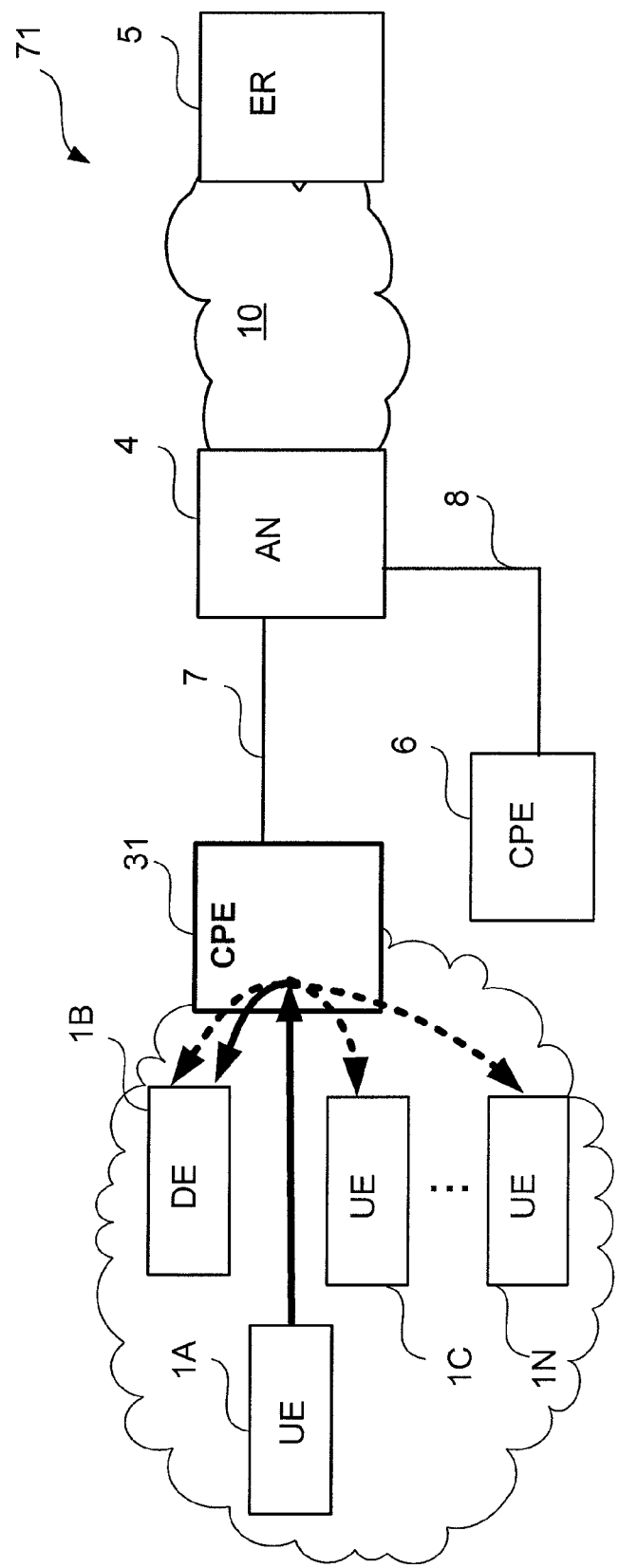
FIG. 7 illustrates an example of link level communication in a data communication network comprising a network node according to another embodiment of the invention.

FIG. 7 shows a data communication network 71 for delivering residential broadband access to a number of user equipments in customer premises networks comprising a network node CPE 31 according the embodiments of the invention as described above. Except from comprising the network node CPE 31, the data communication network 71 in FIG. 7 may be identical to the data communication network 11 in FIG. 1.

In FIG. 7, it is illustrated how a link level message destined to multiple network nodes may be spread by the network node CPE 31 if the actual target for the information/request in the link level message sent by UE 1A is another network node DE 1B also participating in the local network domain of the customer premises network serviced by the CPE 31. The link level message destined to multiple network nodes may be spread from the originating UE 1A exclusively across the local network domain of the customer premises network serviced by the CPE 31. This is illustrated by the dash arrows in FIG. 7. In FIG. 7, it is also illustrated how a link level message destined to multiple network nodes may alternatively be sent by the CPE 31 from the originating UE 1A exclusively to the targeted DE 1B located in the local network domain of the customer premises network serviced by the CPE 31. This is illustrated by the fully drawn arrows in FIG. 7. This means that no network node or device outside of the local network domain of the customer premises network serviced by the CPE 31 will receive the link level message sent by UE 1A in case the actual target for the information/request in the link level message sent by UE 1A is the network node DE 1B also participating in the local network domain of the customer premises network serviced by the CPE 31.

It can thus be seen that unnecessary data traffic is avoided in the data communication network 71 by comparing this data traffic to the data traffic in FIG. 1 according to the prior art. This will also lead to the load on the physical links in the data communication network 71 being reduced. The reduced data traffic may also have the advantage of enabling the interfaces or links in the data communication network 71 to remain in a low-powered, energy saving state instead of being put in a more active, energy consuming state in order to handle increased data traffic in the data communication network 71.

Furthermore, this will also result in that the network nodes, e.g. ER 5, AN 4, CPE 6, etc., will not populate their hardware address tables, such as, MAC address tables, with unnecessary entry posts with the hardware or MAC address for the network node UE 1A originating the link level message if, as previously stated, the actual target for the information/request in the link level message sent by UE 1A is the other network node DE 1B also participating in the local network domain of the customer premises network serviced by the CPE 31.

Figure 8:
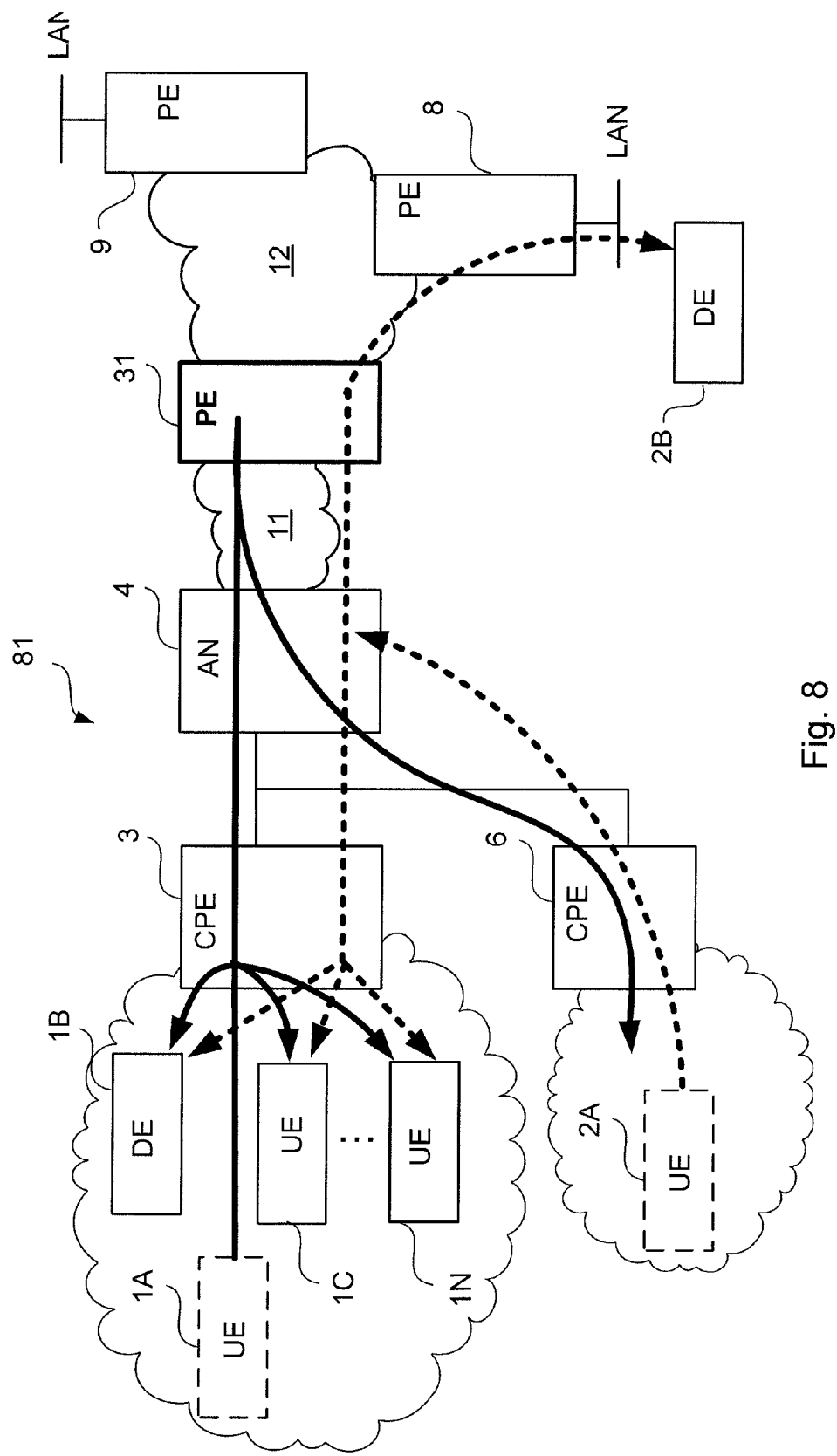

FIG. 8 shows a data communication network 81 for delivering broadband access to a number of user equipments in customer premises networks comprising a network node PE 31 according the embodiments of the invention as described above. Except from comprising the network node PE 31, the data communication network 81 in FIG. 8 may be identical to the data communication network 21 in FIG. 2.

It is illustrated by the fully drawn arrows in FIG. 8 how a link level message destined to multiple network nodes may be spread by the network node PE 31 if the actual target for the information/request in the link level message sent by the network node UE 1A is another network node DE 1B also participating in the local network domain of the aggregation network 11 serviced by the network node PE 31. The link level message destined to multiple network nodes may be spread from the originating UE 1A exclusively across the local network domain of the access network serviced by PE 31. For example, an ARP broadcast message originating from the UE 1A which targets the DE 1B in the local network domain of the access network serviced by PE 31 will only be spread to network nodes, e.g. AN 4, CPE 3, CPE 6, UE-DE 1A-1N, UE 2A, etc., in the local network domain of the access network serviced by PE 31.

It is also illustrates by the dashed arrows in FIG. 8 how a link level message destined to multiple network nodes may be spread by the network node PE 31 from the originating network node UE 2A towards a targeted network node DE 2B located in a remote network domain of an access network serviced by the network node PE 8, which forms part of a shared network domain together with the network nodes PE 31 and PE 9. For example, an NDP multicast message originating from UE 2A which targets DE 2B will not be spread to remote network nodes, such as, PE 9, etc., also forming part of the shared network domain together with the network nodes PE 31 and PE 8, but exclusively to the network node PE 8 behind which the targeted network node DE 2B is located.

It follows that no network node or device outside of the local network domain of the access network serviced by the PE 31 will receive the link level message sent by UE 1A if the actual target for the information/request in the link level message sent by UE 1A is another network node DE 1B also participating in the local network domain of the access network serviced by the PE 31. It also means that no remote network nodes, e.g. PE 8, etc., also participating in the shared network domain will receive the link level message sent by UE 2A if the actual target for the information/request in the link level message sent by UE 2A is a network node DE 2B in a remote network domain of another access network node, e.g. PE 9, also participating in the shared network domain. Thus, the network node PE 31 provides the advantage of avoiding unnecessary data traffic in the data communication network 81.

It also follows that the load on the physical links in the data communication network 81 will be reduced as said unnecessary data traffic in the data communication network 81 is avoided. The reduced data traffic may also have the advantage of enabling the interfaces or links in the data communication network 81 to remain in a low-powered, energy saving state instead of being put in a more active, energy consuming state in order to handle increased data traffic in the data communication network 81. Furthermore, the network nodes will not populate their hardware address tables, such as, e.g. MAC address tables, with unnecessary entry posts of the hardware or MAC address for network nodes originating link level messages.

It should also be noted that the functionality of the network node 31 also may be implemented in an access node, e.g. the AN 4, in order to provide the similar functionality as described in reference to the CPE and PE in FIGS. 6 and 7, respectively.

The description above is of the best mode presently contemplated for practising the present invention. The description is not intended to be taken in a limiting sense, but is made merely for the purpose of describing the general principles of the invention. The scope of the present invention should only be ascertained with reference to the issued claims.

The invention claimed is:

1. A network node configured to associate each of a plurality of MAC addresses with an IP address on a network level, wherein the network node comprises:
   a local network domain interface;
   a hosted or shared network domain interface; and
   a MAC/IP cache for storing MAC/IP associations of the plurality of MAC addresses and the associated IP addresses at the network level;
   wherein the network node is configured to, upon reception of a link level message comprising a target IP address and destined to multiple network nodes, compare the target IP address with the IP addresses in the stored MAC/IP associations;
   wherein, when the target IP address is found amongst the IP addresses in the stored MAC/IP associations, and the MAC address associated with the found target IP address is in the local network domain, the network node is configured to send the received link level message exclusively to at least one other network node in the local network domain by means of a local interface port in the local network domain interface, while dropping the message with respect to network nodes in the shared network domain;
   wherein, when the target IP address is found amongst the IP addresses in the stored MAC/IP associations, and the MAC address associated with the found target IP address is for a target node in the hosted or shared network domain, the network node is configured to send the received link level message toward a target node in the hosted or shared network domain by means of a remote interface port in the hosted or shared network domain interface on a link level; and
   wherein, when the target IP address is not found amongst the IP addresses in the stored MAC/IP associations, the network node is configured to broadcast the message to all other network nodes.

2. The network node according to claim 1, wherein the MAC/IP cache also stores information indicating a physical or logical interface port in the network node for each associated MAC/IP address.

3. The network node according to claim 1, wherein the link level message on a link level is a broadcast or multicast message that are part of the Internet Engineering Task Force (IETF) Link Layer protocols Address Resolution Protocol (ARP) for IPv4 or Neighbor Discovery Protocol (NDP) for IPv6.

4. The network node according to claim 1, wherein the network node is an Ethernet switch or logical bridge/switch in an Internet Protocol/Multiprotocol Label Switching (IP/MPLS) Virtual Private LAN Service (VPLS) domain in a Carrier Ethernet network.

5. The network node according to claim 1, wherein the network node is a bridged residential broadband access customer premises equipment or access node for, Digital Subscriber Line (xDSL), Passive Optical Network (XPON), or Point-to-Point (P2P) Ethernet.

6. A method for use in a network node configured to associate each of a plurality of MAC addresses with an IP address on a network level, wherein the network node includes a local network domain interface and a hosted or shared network domain interface, the method comprising the steps of:
   storing in a MAC/IP cache, MAC/IP associations of the plurality of MAC addresses and the associated IP addresses at the network level;
   upon reception of a link level message destined to multiple network nodes and comprising a target IP address, comparing the target IP address with IP addresses in the stored MAC/IP associations;
   when the target IP address is found amongst the IP addresses in the stored MAC/IP associations, and the MAC address associated with the found target IP address is in the local network domain, exclusively sending the received link level message on a local interface port in the local network domain interface to at least one other network node in the local network domain while dropping the message with respect to network nodes in the hosted or shared network domain;
   when the target IP address is found amongst the IP addresses in the stored MAC/IP associations, and the MAC address associated with the found target IP address is for a target node in the hosted or shared network domain, sending the received link level message on a remote interface port in the hosted or shared network domain interface on a link level toward a target node in the hosted or shared network domain; and
   when the target IP address is not found amongst the IP addresses in the stored MAC/IP associations, broadcasting the message to all other network nodes.

7. A non-transitory computer readable storage medium for use in a network node configured to associate each of a plurality of MAC addresses with an IP address on a network level, wherein the network node includes a local network domain interface and a hosted or shared network domain interface, wherein the non-transitory computer readable storage medium further comprises computer readable instructions, when executed by a processing unit, the computer readable instructions are configured for:

storing in a MAC/IP cache, MAC/IP associations of the plurality of MAC addresses and the associated IP addresses at the network level;

upon reception of a link level message destined to multiple network nodes and comprising a target IP address, comparing the target IP address with IP addresses in the stored MAC/IP associations;

when the target IP address is found amongst the IP addresses in the stored MAC/IP associations, and the MAC address associated with the found target IP address is in the local network domain, exclusively sending the received link level message on a local interface port in the local network domain interface to at least one other network node in the local network domain while dropping the message with respect to network nodes in the hosted or shared network domain;

when the target IP address is found amongst the IP addresses in the stored MAC/IP associations, and the MAC address associated with the found target IP address is for a target node in the hosted or shared network domain, sending the received link level message on a remote interface port in the hosted or shared network domain interface on a link level toward a target node in the hosted or shared network domain; and when the target IP address is not found amongst the IP addresses in the stored MAC/IP associations, broadcasting the message to all other network nodes.

* * * * *

UNITED STATES PATENT AND TRADEMARK OFFICE
CERTIFICATE OF CORRECTION

PATENT NO. : 9,025,606 B2  
APPLICATION NO. : 13/638789  
DATED : May 5, 2015  
INVENTOR(S) : Thyni et al.

Page 1 of 1

It is certified that error appears in the above-identified patent and that said Letters Patent is hereby corrected as shown below:

On the Title Page, in item (75), under "Inventors", in Column 1, Line 1, delete "Jarfalla (SE);" and insert -- Järfälla (SE); --, therefor.

On the Title Page, in item (75), under "Inventors", in Column 1, Line 2, delete "Ronninge (SE)" and insert -- Rönninge (SE) --, therefor.

On the Title Page, in item (73), under "Assignee", in Column 1, Line 1, delete "Ecrisson" and insert -- Ericsson --, therefor.

In the Drawings

In Fig. 8, Sheet 7 of 7, delete " 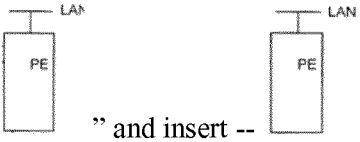 " and insert -- 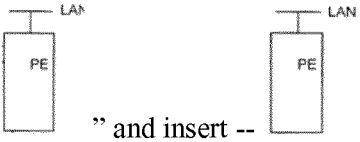 --, therefor.

In the Specification

In Column 1, Lines 7-8, delete "A method and network node for use in link level communication in a data The invention" and insert -- The invention --, therefor.

Signed and Sealed this  
Twenty-third Day of February, 2016

Michelle K. Lee  
*Director of the United States Patent and Trademark Office*